Sept. 26, 1939.  L. H. VANDERWERF  2,174,493
AUTOMOTIVE VEHICLE
Filed Nov. 17, 1937   2 Sheets-Sheet 1
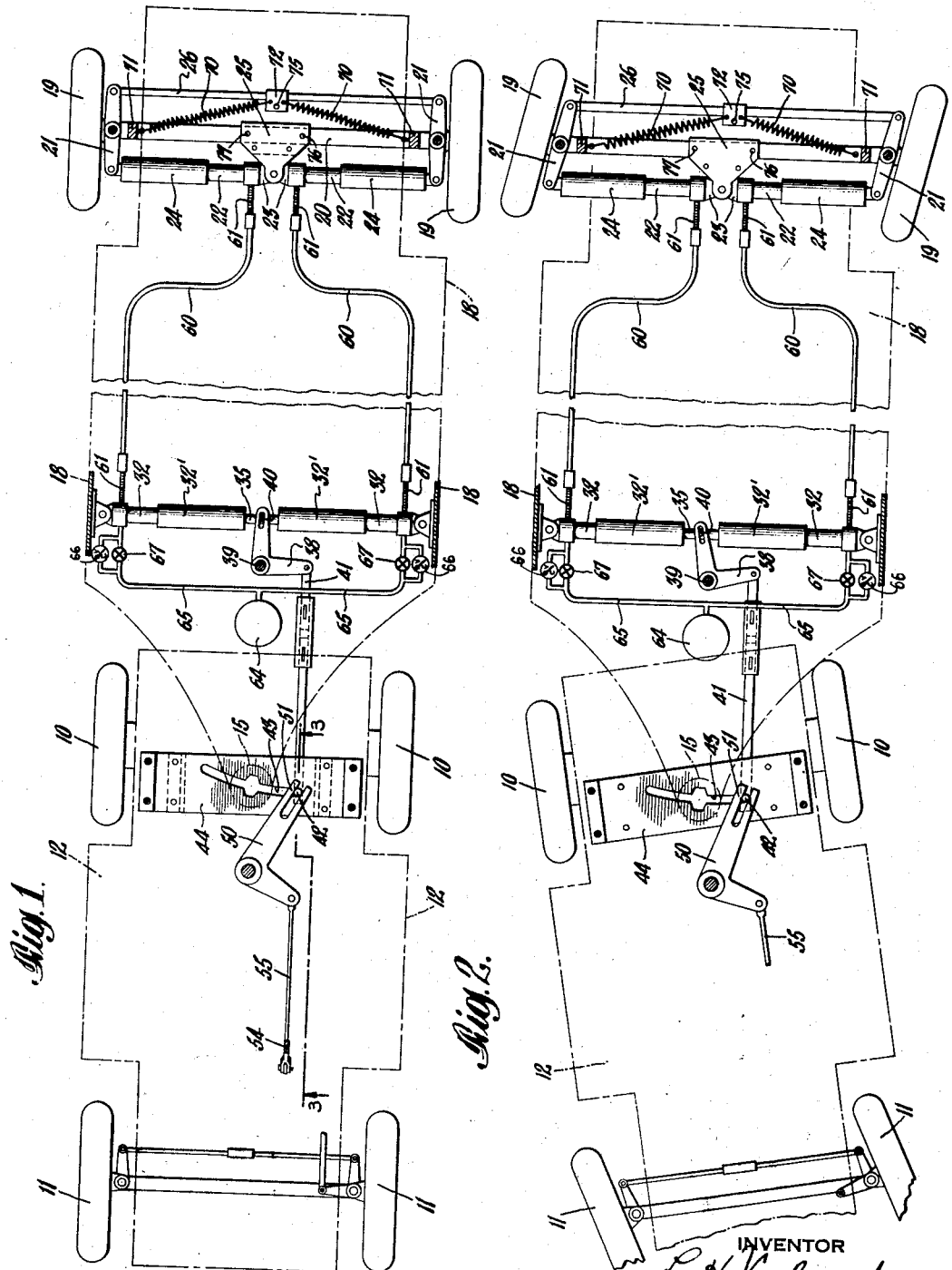
INVENTOR
L. H. Vanderwerf
BY
Morgan Finnegan and Durham
ATTORNEYS Sept. 26, 1939.   L. H. VANDERWERF   2,174,493
AUTOMOTIVE VEHICLE
Filed Nov. 17, 1937   2 Sheets-Sheet 2

INVENTOR
L. H. Vanderwerf
BY
ATTORNEYS

Patented Sept. 26, 1939

2,174,493

UNITED STATES PATENT OFFICE 2,174,493

AUTOMOTIVE VEHICLE

Leonard H. Vanderwerf, New York, N. Y., assignor, by mesne assignments, to Triplex Machine Tool Corp., New York, N. Y., a corporation of New York Application November 17, 1937, Serial No. 174,918

1 Claim. (Cl. 280—33.55)

The present invention relates to trailer steering mechanism and more particularly to a novel and improved hydraulic steering mechanism suitable for use with a semi-trailer such as is used with automotive tractors.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a diagrammatic plan view of an illustrative tractor and semi-trailer embodying the present invention;

Figure 2 is a similar view showing the vehicles in different position;

Figure 3:
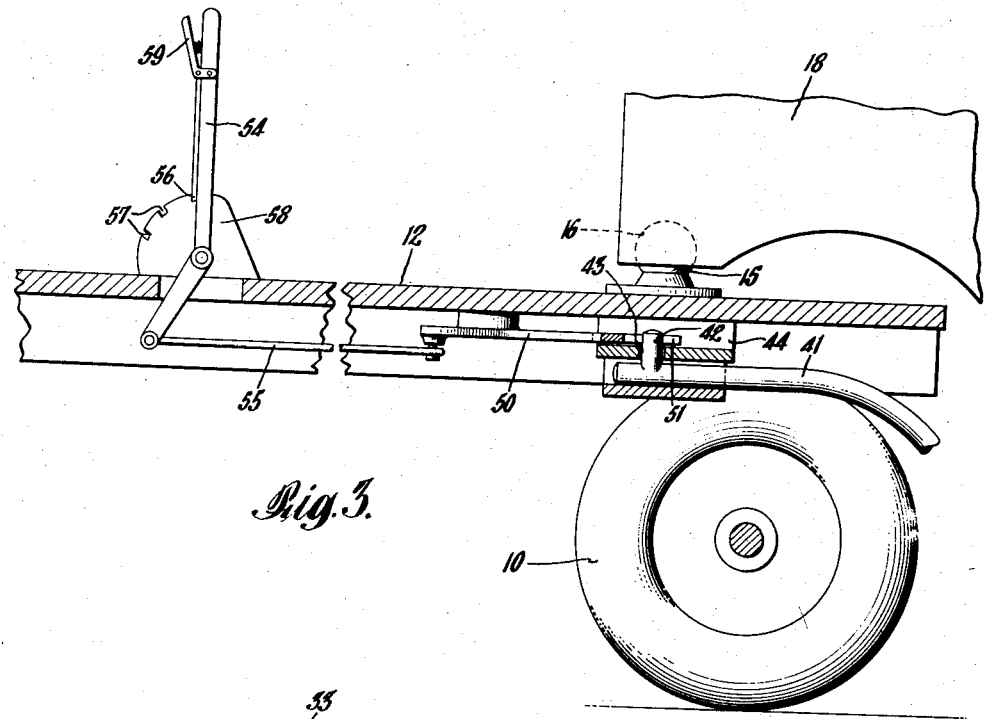
Figure 3 is a longitudinal, fragmentary sectional view of the device shown in Figures 1 and 2.

The present invention has for its object the provision of a novel and improved semi-trailer steering device adapted to automatically steer the semi-trailer in accordance with the relative movement between it and its tractor. A further object of the invention is the provision of a hydraulically actuated semi-trailer steering device which can be easily and accurately installed on a semi-trailer and will require a minimum number of parts. Still another object of the invention is the provision of an automatic semi-trailer steering device which can be reversed in its operation so as to permit better manipulation of the semi-trailer in manoeuvering the trailer into small spaces. The invention also provides a steering device for semi-trailers in which the steering is stable and is not seriously affected by vibration of its parts.

In the illustrative embodiment of the invention, the semi-trailer and its tractor are hitched together by any suitable means so as to permit relative angular movement of the two vehicles, and the semi-trailer is provided with one or more sets of dirigible wheels and axles which may be generally similar to the wheels and axles commonly used for the front of the tractor. On the semi-trailer, and preferably near its front end, are mounted a pair of hydraulic cylinders or other fluid pressure creating devices which are connected by conduits with hydraulic cylinders or motors positioned adjacent to the dirigible semi-trailer wheels and are connected therewith to steer the wheels. Link means are provided interconnecting the semi-trailer and its tractor so that angular movement of the semi-trailer and tractor serves to compress the liquid in one pump and to expand the liquid chamber in the other pump, thereby causing a similar movement of the motor cylinders to steer the semi-trailer wheels sufficiently so that they will travel on circles concentric with the radius of turning of the tractor. Means are also provided for shifting the link connection so that the trailer steering action may be reversed with the tractor travelling rearwardly, or may be moved to a neutral position when it is desired not to steer the semi-trailer except in the conventional manner. Spring means may also be provided tending to center the semi-trailer dirigible wheels.

It will be understood that the foregoing general description and the following detailed description as well, are exemplary and explanatory of the invention but are not restrictive thereof.

Referring now in detail to the illustrative embodiment of the invention as shown by the accompanying drawings, there is provided a conventional tractor, which is an automotive vehicle having driving wheels 10 and dirigible wheels 11 mounted on a chassis 12 in the conventional manner. A pivotal connection of conventional construction is provided between the rear of the tractor and the front end of the semi-trailer for supporting the front end of the semi-trailer on the rear end of the tractor and for applying the tractive effort of the driving wheels 10 to the semi-trailer. This pivotal connection may comprise a conventional fifth-wheel coupling and is shown as a ball-and-socket joint, the ball 15 being supported on the rear end of the chassis and slightly in advance of the rear tractor axle, while the socket 16 is supported beneath and attached to the front end of the semi-trailer.

The semi-trailer comprises a chassis 18 supported on the road by means of an axle 20 and dirigible wheels 19 which are connected to the axle 20 by means of steering knuckles 21 pivotally mounted at the ends of the axle 19.

Dirigible wheels 19 and the steering knuckles 21 are connected to their individual hydraulic cylinders and may be moved thereby, and each of these cylinders comprises a relatively long and narrow cylinder 22 provided with a closed end which carries a lug 23 by which the cylinder is pivotally connected to a central support 25. Cylinder 22 is fitted over and slidable on a piston 24 which is pivotally connected to the steering knuckles 21 fixed to the axle 20 so that the cylinders and their pistons lie substantially parallel to the axle 20. A tie rod 26 is provided between the steering knuckles for the dirigible wheels and is pivotally connected thereto in the usual manner so as to maintain the wheels in proper alinement.

Figure 4:
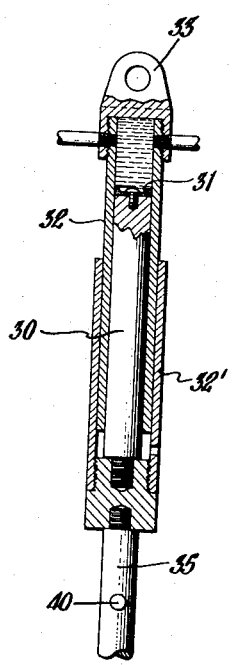
Figure 4 is a fragmentary, detailed sectional view of a connecting link as used in the embodiment.

The hydraulic pumps mounted at the front end of the semi-trailer and supported on the chassis also comprise a cylinder and piston as shown in detail in Figure 4. As embodied, there is a piston 30 having a piston leather 31 attached to its inner end and mounted for reciprocation within the cylinder 32, and dust cap 32'. Cylinder 32 is pivotally mounted on the lug 33 attached to the under side of the semi-trailer chassis. Pistons 30 extend towards each other and are connected together for simultaneous movement by means of the single rod 35 which is adapted to be moved by relative angular movement of the trailer and tractor.

The steering movement of the dirigible trailer wheels is accomplished by means of link mechanism interconnecting the tractor and semi-trailer and as embodied, a bell crank 38 is mounted on a pivot 39 mounted centrally of the semi-trailer chassis and on the under side thereof. Bell crank 38 is connected by pin and slot connection 40 to the central common rod 35, and to link 41, while link 41 has at its other end a pivot pin 42 which projects into a slot 43 in plate 44. Plate 44 is mounted rigidly with respect to the fifth wheel or coupling, and the slot 43 is concentric with the pin pivotally connecting the end of the link 41 with the arm of the bell crank 38, and slot 43 is of a sufficient length so that the pin 42 may be spaced from the king pin or other pivot point of the fifth wheel the same distance as the other end of link 41 is spaced from the pivot pin 39.

Means are provided for holding the pivot pin 42 at either end or centrally of the slot 43 and for moving it to any one of these positions so as to shift the steering from forward to neutral or reverse, as may be desired. For this purpose, a bell crank 50 is pivotally mounted on the tractor and is provided with a bifurcated end 51 which fits over the pivot pin 42 holding it in the desired position, and bell crank 51 is moved to one side or the other by means of a manually moved lever 54 which is pivotally mounted for convenient operation by the driver, and is connected to the bell crank by rod 55. Lever 54 may be locked in any of its positions by means of the detent 56 engaging one or the other of the notches 57 in segment 58, and is released for movement by means of the hand grip 59. In the position shown, the device is positioned for forward operation, but by moving the lever 54 to its intermediate position, pin 42 is positioned centrally of the slot 43 and no movement of the dirigible wheels takes place. Similarly, movement of the pin 42 to the other end of the slot positions the device for reverse steering movement, so that as the tractor and semi-trailer are backed, the semi-trailer wheels are steered oppositely to the front wheels, thereby decreasing the space needed for manipulation of the semi-trailer.

Hydraulic fluid, such as is commonly used for hydraulic brake systems, is supplied to fill the several cylinders, and the pump cylinders and their respective motor cylinders are interconnected by means of the conduits 60 having flexible ends 61, each pump cylinder being connected to the motor cylinder on the same side. Additional fluid may be supplied, to replenish that lost from the cylinders, from a reservoir 64 which is connected to the pump cylinders by means of the conduits 65, and the flow of this replenishing fluid is automatically controlled by means of the check operated valves 66, while the lines may be bled by means of the manually operated valves 67.

Springs are provided for stabilizing the dirigible wheels of the semi-trailer, and for this purpose, coil springs 70 of considerable strength are tensioned between lugs 71 at the ends of the axle 20 and an anchor plate 72 clamped to the tie rod 26.

The operation of the illustrative embodiment of the invention may be summarized as follows:

When the vehicle is being driven straight ahead the wheels 10, 11 and 19 are in parallel planes, the wheels 19 being held in the position shown in Figure 1 by the tie rod 26 and by the link and lever elements 41, 42, 38, acting through the hydraulic pumps 30 and motors 21, 22, 24. As the vehicle is steered to the left (Fig. 2), the tractor 12 and semi-trailer 18 are angularly moved relative to one another, and the link 41 is moved rearwardly compressing the hydraulic fluid in one cylinder 30 and expanding the chamber of the other cylinder 30 to move the wheels 19 as shown and proportionally to the movement of the steering wheels 11. When the distance of pin 42 to the center of the slot 43 is the same as the length of the transverse arm of bell crank 38, and the pin-and-slot connection 40 is spaced from pin 39 the same as the distance between the pivot pin for cylinder 22 from their respective king pins, the wheels 19 will be turned to the same angular extent as wheels 11 are turned and thereby all of the wheels will travel on concentric circular paths.

When it is desired to back the tractor and semi-trailer, the hand lever 54 is moved to its extreme forward position, thereby shifting the pin 42 to the other end of slot 43, and when so arranged, the wheels 19 will be steered oppositely and will cause the rear end of the trailer to be swung to the right, as the front of the tractor is steered to the left. Thus by manipulating the lever 54, the vehicle may be maneuvered much more easily than is otherwise possible.

The invention is in its broader aspects is not limited to the specific mechanisms shown and described but departures may be made therefrom within the scope of the accompanying claim without departing from the principles of the invention and without sacrificing its chief advantages.

This invention relates to subject matter similar to that contained in my Patent No. 2,152,511 granted on March 28, 1939.

What I claim is:

In an automotive tractor-trailer vehicle, a steerable tractor; a trailer having its front end pivotally supported upon the back end of said tractor, steerable wheels on said trailer for controlling the movement of said trailer as said tractor is steered, a hydraulic pump system connected to said wheels and actuated by angular movement between said tractor and trailer for steering said wheels, and means for controlling the degree of steering of said steerable wheels when actuated by said angular movement permitting greater flexibility between said tractor and trailer to make said combination more easily operable, comprising a bell crank pivotally mounted upon said trailer and having one of its arms pivotally connected to said hydraulic pump system to operate the same when said angular movement takes place, a link having one of its ends pivotally connected to the other arm of said bell crank, a plate mounted on said tractor and having a slot formed in an arc concentric with the point of pivot between the latter-mentioned arm of said bell crank and said link, a peg mounted on the free end of said link and engaging into said slot, and means for moving said peg to various fixed adjusted positions along the length of said slot to change the point of pivot between said tractor and said link to control the said link during steering of said tractor.

LEONARD H. VANDERWERF.